US008015721B2

(12) United States Patent
Eaton et al.

(10) Patent No.: US 8,015,721 B2
(45) Date of Patent: *Sep. 13, 2011

(54) COORDINATE MEASUREMENT MACHINE WITH IMPROVED JOINT

(75) Inventors: Homer L Eaton, Carlsbad, CA (US); Paul A Ferrari, Carlsbad, CA (US)

(73) Assignee: Hexagon Metrology AB, North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,940

(22) Filed: Jun. 24, 2010

(65) Prior Publication Data

US 2010/0257746 A1  Oct. 14, 2010

Related U.S. Application Data

(63) Continuation of application No. 11/943,463, filed on Nov. 20, 2007, now Pat. No. 7,743,524.

(60) Provisional application No. 60/860,239, filed on Nov. 20, 2006.

(51) Int. Cl.
*G01B 5/004* (2006.01)
*G01B 5/008* (2006.01)
(52) U.S. Cl. .................. 33/503; 33/556; 33/1 PT
(58) Field of Classification Search ............ 33/503, 33/556, 558, 559, 561, 1 M, 1 PT
See application file for complete search history.

(56) References Cited

U.S. PATENT DOCUMENTS

| 4,492,036 A | * | 1/1985 | Beckwith, Jr. ............ 33/613 |
| 4,972,090 A | | 11/1990 | Eaton |
| 5,084,981 A | | 2/1992 | McMurtry et al. |
| 5,088,337 A | | 2/1992 | Bennett |
| 5,148,377 A | | 9/1992 | McDonald |
| 5,187,874 A | | 2/1993 | Takahashi et al. |
| 5,189,797 A | | 3/1993 | Granger |
| 5,223,709 A | * | 6/1993 | Pettypiece, Jr. ............ 250/229 |
| 5,396,712 A | | 3/1995 | Herzog |
| 5,408,754 A | | 4/1995 | Raab |
| 5,412,880 A | | 5/1995 | Raab |
| 5,505,003 A | | 4/1996 | Evans et al. |
| 5,510,977 A | | 4/1996 | Raab |
| 5,521,847 A | | 5/1996 | Ostrowski et al. |

(Continued)

FOREIGN PATENT DOCUMENTS

DE   4345091   7/1995

(Continued)

OTHER PUBLICATIONS

International Search Report and Written Opinion for PCT/US2007/085315 filed Nov. 20, 2007, mailed May 9, 2008.

*Primary Examiner* — Amy Cohen Johnson
(74) *Attorney, Agent, or Firm* — Knobbe Martens Olson & Bear LLP

(57) ABSTRACT

In one embodiment, a coordinate measurement apparatus includes an articulated arm having a first end and a second end with at least a first arm segment and a second arm segment therebetween. Further, the apparatus can comprise at least one ball and socket joint connecting the first arm segment to the second arm segment, with the ball and socket joint including a ball member and a socket member, and a measurement probe attached to the first end of said articulated arm.

20 Claims, 6 Drawing Sheets

U.S. PATENT DOCUMENTS

| | | | |
|---|---|---|---|
| 5,526,576 A | | 6/1996 | Fuchs et al. |
| 5,528,505 A | | 6/1996 | Granger et al. |
| 5,611,147 A | | 3/1997 | Raab |
| 5,615,489 A | | 4/1997 | Breyer et al. |
| 5,701,140 A | * | 12/1997 | Rosenberg et al. ........... 345/156 |
| 5,757,499 A | | 5/1998 | Eaton |
| 5,768,792 A | | 6/1998 | Raab |
| 5,794,356 A | | 8/1998 | Raab |
| 5,822,450 A | | 10/1998 | Arakawa et al. |
| 5,829,148 A | * | 11/1998 | Eaton ............................... 33/503 |
| 5,909,939 A | * | 6/1999 | Fugmann ......................... 33/503 |
| 5,978,748 A | | 11/1999 | Raab |
| 5,991,704 A | | 11/1999 | Rekar et al. |
| 6,086,283 A | * | 7/2000 | Ziegert ............................. 403/57 |
| 6,134,506 A | | 10/2000 | Rosenberg et al. |
| 6,161,079 A | | 12/2000 | Zink et al. |
| 6,166,811 A | | 12/2000 | Long et al. |
| 6,219,928 B1 | | 4/2001 | Raab et al. |
| 6,366,831 B1 | | 4/2002 | Raab |
| 6,487,896 B1 | | 12/2002 | Dall'Aglio |
| 6,526,670 B1 | | 3/2003 | Carli |
| 6,598,306 B2 | | 7/2003 | Eaton |
| 6,611,346 B2 | | 8/2003 | Granger |
| 6,611,617 B1 | | 8/2003 | Crampton |
| 6,618,496 B1 | | 9/2003 | Tassakos et al. |
| 6,668,466 B1 | | 12/2003 | Bieg et al. |
| 6,759,648 B2 | | 7/2004 | Baxter et al. |
| 6,817,108 B2 | | 11/2004 | Eaton |
| 6,892,465 B2 | | 5/2005 | Raab et al. |
| 6,904,691 B2 | | 6/2005 | Raab et al. |
| 6,925,722 B2 | | 8/2005 | Raab et al. |
| 6,931,745 B2 | | 8/2005 | Granger |
| 6,935,036 B2 | | 8/2005 | Raab et al. |
| 6,952,882 B2 | | 10/2005 | Raab et al. |
| 6,984,236 B2 | | 1/2006 | Raab |
| 6,988,322 B2 | | 1/2006 | Raab et al. |
| 7,003,892 B2 | | 2/2006 | Eaton et al. |
| 7,017,275 B2 | | 3/2006 | Raab et al. |
| 7,043,847 B2 | | 5/2006 | Raab et al. |
| 7,051,450 B2 | | 5/2006 | Raab et al. |
| 7,073,271 B2 | | 7/2006 | Raab et al. |
| 7,096,077 B2 | | 8/2006 | Price et al. |
| 7,152,456 B2 | | 12/2006 | Eaton |
| 7,174,651 B2 | | 2/2007 | Raab et al. |
| 7,246,030 B2 | | 7/2007 | Raab et al. |
| 7,269,910 B2 | | 9/2007 | Raab et al. |
| 7,296,364 B2 | | 11/2007 | Seitz et al. |
| 7,296,979 B2 | | 11/2007 | Raab et al. |
| 7,372,581 B2 | | 5/2008 | Raab et al. |
| 7,395,606 B2 | | 7/2008 | Crampton |
| 7,441,341 B2 | | 10/2008 | Eaton |
| 7,525,276 B2 | | 4/2009 | Eaton |
| 7,546,689 B2 | | 6/2009 | Ferrari et al. |
| 7,568,293 B2 | | 8/2009 | Ferrari |
| 7,578,069 B2 | | 8/2009 | Eaton |
| D599,226 S | | 9/2009 | Gerent et al. |
| 7,624,510 B2 | | 12/2009 | Ferrari |
| 7,640,674 B2 | | 1/2010 | Ferrari et al. |
| 7,676,945 B2 | | 3/2010 | Prestidge et al. |
| 7,693,325 B2 | | 4/2010 | Pulla et al. |
| 7,743,524 B2 | * | 6/2010 | Eaton et al. ..................... 33/503 |
| 7,774,949 B2 | | 8/2010 | Ferrari |
| 7,779,548 B2 | | 8/2010 | Ferrari |
| 7,805,854 B2 | | 10/2010 | Eaton |
| 2004/0163268 A1 | * | 8/2004 | McMurtry et al. .............. 33/556 |
| 2004/0211284 A1 | * | 10/2004 | Roy et al. .................... 74/490.01 |
| 2005/0166413 A1 | | 8/2005 | Crampton |
| 2005/0193451 A1 | * | 9/2005 | Quistgaard et al. ............... 901/9 |
| 2008/0016711 A1 | | 1/2008 | Baebler |
| 2009/0133276 A1 | * | 5/2009 | Bailey ............................. 33/503 |
| 2010/0095542 A1 | | 4/2010 | Ferrari |

FOREIGN PATENT DOCUMENTS

| | | |
|---|---|---|
| DE | 10112977 | 11/2002 |
| EP | 0522610 | 1/1993 |
| FR | 2740546 | 4/1997 |
| GB | 2274526 | 7/1994 |
| JP | 63-195206 | 12/1988 |
| JP | 04-032393 | 2/1992 |
| JP | 04057690 | 2/1992 |
| JP | 05-031685 | 2/1993 |
| JP | 2003-021133 | 1/2003 |
| JP | 2003-175484 | 6/2003 |
| JP | 2003-275484 | 9/2003 |
| JP | 2006-214559 | 8/2006 |
| WO | WO 98/08050 | 2/1998 |

* cited by examiner

COORDINATE MEASUREMENT MACHINE WITH IMPROVED JOINT

CROSS REFERENCE TO RELATED APPLICATION

This application is a continuation of U.S. patent application Ser. No. 11/943,463, filed on Nov. 20, 2007 and entitled "COORDINATE MEASUREMENT MACHINE WITH IMPROVED JOINT," which claims the benefit of U.S. Provisional Application No. 60/860,239, entitled "COORDINATE MEASUREMENT MACHINE WITH IMPROVED JOINT," filed on Nov. 20, 2006, and the entirety each of these is hereby incorporated by reference.

BACKGROUND

1. Field of the Invention

The present application relates to measuring devices, and more particularly, articulated arm coordinate measurement machines for measuring the coordinates of three-dimensional objects.

2. Description of the Related Art

Rectilinear measuring systems, also referred to as coordinate measuring machines (CMM's) and articulated arm measuring machines including portable coordinate measuring machines (PCMM's) have been described for generating geometry information from various objects and areas. In general, these instruments capture the structural characteristics of an object for use in electronic rendering and duplication. One example of a conventional apparatus used for coordinate data acquisition comprises a support and a movable measuring arm made up of hinged segments to which a contact-sensitive probe or remote scanning device is attached.

Geometry information or three-dimensional coordinate data characterizing the shape, features, and size of the object may be acquired by tracing or scanning along the object's surface and contours. Probe or scanning device movement is typically tracked relative to a reference coordinate system resulting in a collection of data points and information that may be used to develop an accurate electronic rendering of the object. In conventional implementations, the acquired geometry information is processed by a computer capable of making use of the information to model the surface contours and dimensions of the object.

SUMMARY OF THE INVENTION

In one embodiment, a coordinate measurement apparatus comprises an articulated arm having a first end and a second end with at least a first arm segment and a second arm segment therebetween. Further, the apparatus comprises at least one ball and socket joint connecting the first arm segment to the second arm segment, with said ball and socket joint including a ball member and a socket member, and a measurement probe attached to the first end of said articulated arm. In another embodiment, the ball member comprises at least one graphical pattern and the socket member comprises at least one optical reader device configured to read said graphical pattern. In other arrangements, the optical reader device comprises a camera. In yet another embodiment, the ball member is maintained adjacent to the socket member using at least one magnet member. In still another embodiment, the ball member is maintained adjacent to the socket member using at least one vacuum port.

In another arrangement, a coordinate measurement apparatus further comprises a slip ring rotatably connected to the first arm segment. In other embodiments, the coordinate measurement apparatus includes one or more hardwired connections attached to the slip ring. Such hardwired connections are in electronic communication with the second arm segment, and are configured to transfer data between said first arm segment and said first arm segment.

In some embodiments, a coordinate measurement apparatus comprises an articulated arm having a first end, a second end, at least a first arm segment and a second arm segment therebetween. Further, the coordinate measurement apparatus includes at least one joint connecting said first arm segment to said second arm segment, said joint configured to allow said first arm segment to pivot and rotate relative to said second arm segment, and a measurement probe attached to said first end of said articulated arm. In another arrangement, a coordinate measurement apparatus comprises an articulated arm having a first end, a second end, at least a first arm segment and a second arm segment therebetween. Further, at least one joint connects the first arm segment to the second arm segment, said joint comprising a first joint member and a second joint member. In addition, the coordinate measurement apparatus includes a measurement probe attached to said first end of said articulated arm, wherein either of said first joint member or second joint member comprises a generally convex surface and the other of either said first joint member or said second joint member comprises a rounded surface configured to generally mate with said convex surface of said first joint member so that said first arm segment is configured to pivot and rotate relative to said second arm segment.

A method of operating a coordinate measurement apparatus to acquire coordinate data regarding a target surface comprises moving a first arm segment relative to a second arm segment using a first joint, said first joint configured to permit said first arm segment to pivot and rotate relative to said second arm segment and acquiring position data of the pivotal and rotational position of the first arm segment relative to the second arm segment from a data surface of the first joint. Further, the method includes moving a probe member connected to said first arm segment relative to said target surface.

In some embodiments, a coordinate measurement apparatus is provided comprising an articulated arm, at least one joint, and a measurement probe. The articulated arm has a first end, a second end, and at least a first arm segment and a second arm segment therebetween. The at least one joint connects said first arm segment to said second arm segment. The joint comprises a first joint member and a second joint member. The measurement probe is attached to said first end of said articulated arm. Said joint is capable of movement in two or more degrees of freedom, and measurement of both degrees of freedom is done by measuring a single coded surface.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF THE PREFERRED EMBODIMENTS

Figure 1:
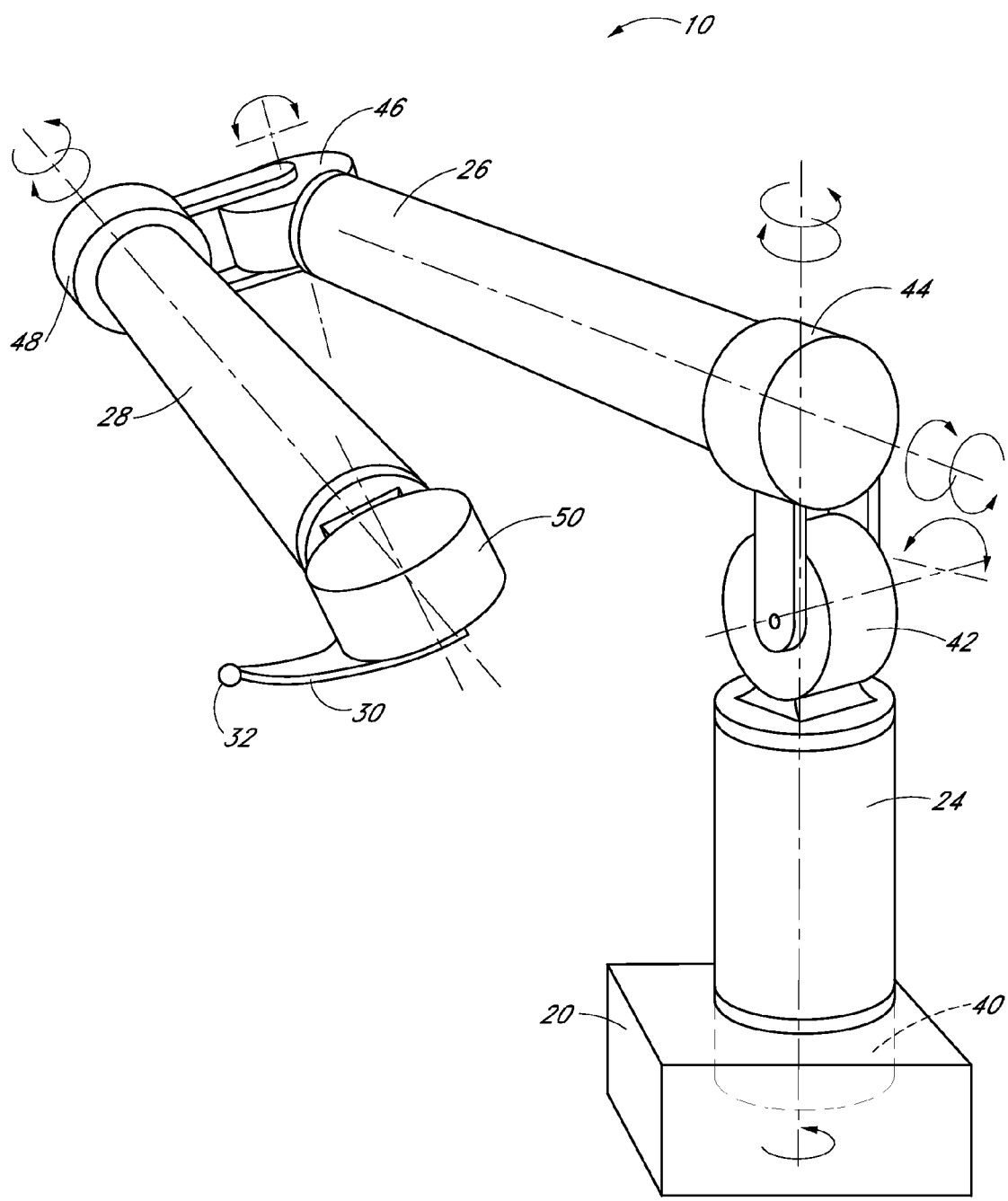
FIG. 1 is a perspective view of an embodiment of a coordinate measuring machine.

FIG. 1 illustrates one embodiment of a prior art coordinate measuring machine (CMM) 10. In the illustrated embodiment, the CMM 10 comprises a base 20, a plurality of rigid transfer members 24, 26, 28, a coordinate acquisition member 30 and a plurality of articulation members 40, 42, 44, 46, 48, 50 connecting the rigid transfer members 24, 26, 28 to one another. Each articulation member is configured to impart one or more rotational and/or angular degrees of freedom. Through the various articulation members 40, 42, 44, 46, 48, 50, the CMM 10 can be aligned in various spatial orientations thereby allowing fine positioning of the coordinate acquisition member 30 in three-dimensional space.

The position of the rigid transfer members 24, 26, 28 and the coordinate acquisition member 30 may be adjusted using manual, robotic, semi-robotic and/or any other adjustment method. In one embodiment, the CMM 10, through the various articulation members, is provided with seven rotary axes of movement. It will be appreciated, however, that there is no strict limitation to the number of axes of movement that may be used, and fewer or additional axes of movement may be incorporated into the CMM design.

In various embodiments, the coordinate acquisition member 30 comprises a contact sensitive member or probe 32 configured to engage the surfaces of a selected object and generate coordinate data on the basis of probe contact. Alternatively, the coordinate acquisition member 30 may comprise a remote scanning and detection component that does not necessarily require direct contact with the selected object to acquire geometry data. In one embodiment, a laser coordinate detection device (e.g., laser camera) may be used to obtain geometry data without direct object contact. It will be appreciated that various coordinate acquisition member configurations including: a contact-sensitive probe, a remote-scanning probe, a laser-scanning probe, a probe that uses a strain gauge for contact detection, a probe that uses a pressure sensor for contact detection, a probe that used an infrared beam for positioning, and a probe configured to be electrostatically-responsive may be used for the purposes of coordinate acquisition.

In other embodiments, one or more of the rigid transfer members 24, 26, 28 comprise a composite structure that includes an inner portion and an outer exoskeletal portion. In such an arrangement, the inner portion of the rigid transfer members 24, 26, 28 are interconnected to one another through articulation members that provide the ability to position the coordinate acquisition member 30 in a variety of different orientations in three dimensional space. The outer portions surrounding the various inner portions of the rigid transfer members 24, 26, 28 form an environmental barrier that at least partially encloses segments of the inner portions. In one aspect, the inner portions are configured to "float" inside the corresponding outer portions.

As is known in the art, the position of the probe 32 in space at a given instant can be calculated by knowing the length of each member and the specific position of each of the articulation members 40, 42, 44, 46, 48, 50. Each of the articulation members 40, 42, 44, 46, 48, 50 can be broken down into a singular rotational degree of motion, each of which may be measured using a dedicated rotational transducer. Each transducer outputs a signal (e.g., an electrical signal), which varies according to the movement of the 40, 42, 44, 46, 48, 50 in its degree of motion. The signal can be carried through wires or otherwise transmitted to a base 20. From there, the signal can be processed and/or transferred to a computer for determining the position of the probe 32 in space.

In one embodiment, the transducer can comprise an optical encoder. In general, each encoder measures the rotational position of its axle by coupling is movement to a pair of internal wheels having successive transparent and opaque bands. In such embodiments, light can be shined through the wheels onto optical sensors which feed a pair of electrical outputs. As the axle sweeps through an arc, the output of the analog encoder can be substantially two sinusoidal signals which are 90 degrees out of phase. Coarse positioning can occur through monitoring the change in polarity of the two signals. Fine positioning can be determined by measuring the actual value of the two signals at the instant in question. In certain embodiments, maximum accuracy can be obtained by measuring the output precisely before it is corrupted by electronic noise. Additional details and embodiments of the illustrated embodiment of the CMM 10 can be found in U.S. Pat. No. 5,829,148, the entirety of which is hereby incorporated by reference herein.

While the above described CMM 10 has been proven to be particularly advantageous improvement can be made. For example, between the rigid transfer members 24, 26, 28, the device 10 includes six articulation members 40, 42, 44, 46, 48, 50. Thus, between each transfer member, there is one articulation member configured to provide rotational movement and another articulation member that provides hinge-like movement. Each articulation member includes a transducer. Thus, it can be advantageous to reduce the number of articulation members and thus the number of transducers between transfer members.

Figure 2:
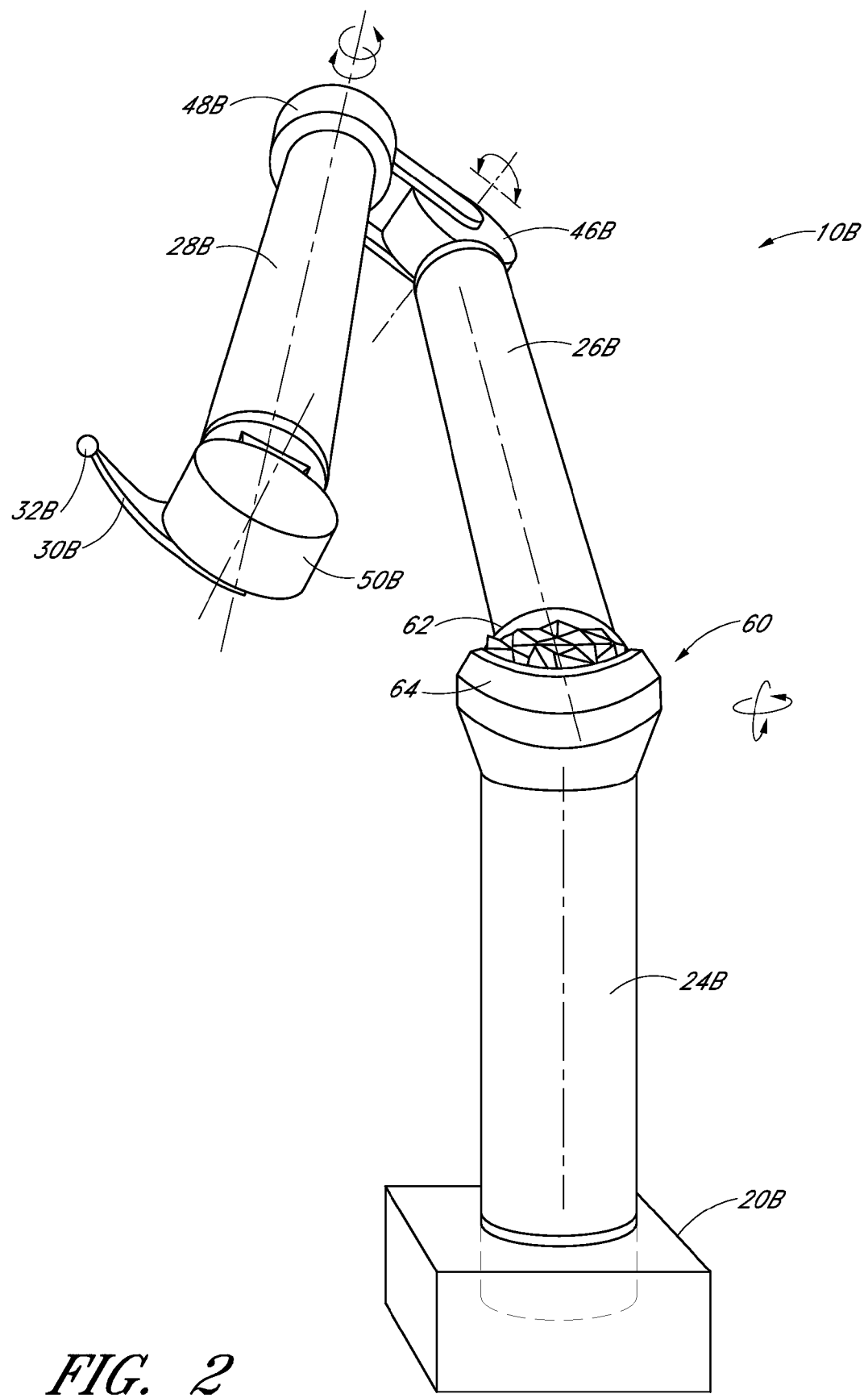
FIG. 2 is a perspective view of an embodiment of a coordinate measuring machine including a ball and socket type articulation member.

FIG. 2 illustrates one embodiment of a CMM 10B, which includes an articulation member 60 that is configured to provide two degrees of freedom between transfer members 24B, 26B. It should be appreciated that, while only one articulation member 60 with two degrees of freedom is shown in the CMM 10B, in modified embodiments, the CMM 10B can include 2, 3 or more articulation members 60 between other transfer members or components of the CMM 10B. In the illustrated embodiment, the articulation member 60 comprises includes a ball and socket type joint that permits one rigid transfer member 26B to swivel relative to another rigid transfer member 24B. Consequently, the need for multiple articulation members between transfer members is eliminated, as single ball and socket type articulation member 60 provides two degrees of freedom.

With continued reference to FIG. 2, a ball (or male) portion 62 of the articulation member 60 is positioned on the upper rigid transfer member 26B and the socket (or female) portion 64 is positioned on the lower rigid transfer member 24B. Alternatively, the articulation member 60 may be configured so that the orientation of the ball and socket portions 62, 64 is reversed. Further, as mentioned above, additional ball and socket type articulation members can be provided between rigid transfer members of a CMM 10B to further simplify its overall design. In the embodiment illustrated in FIG. 2, the ball and socket type articulation member 60 also eliminates the need for a swiveling articulation member 40 at the base of the CMM (see FIG. 1) while still providing hinge-like movement.

Figure 3:
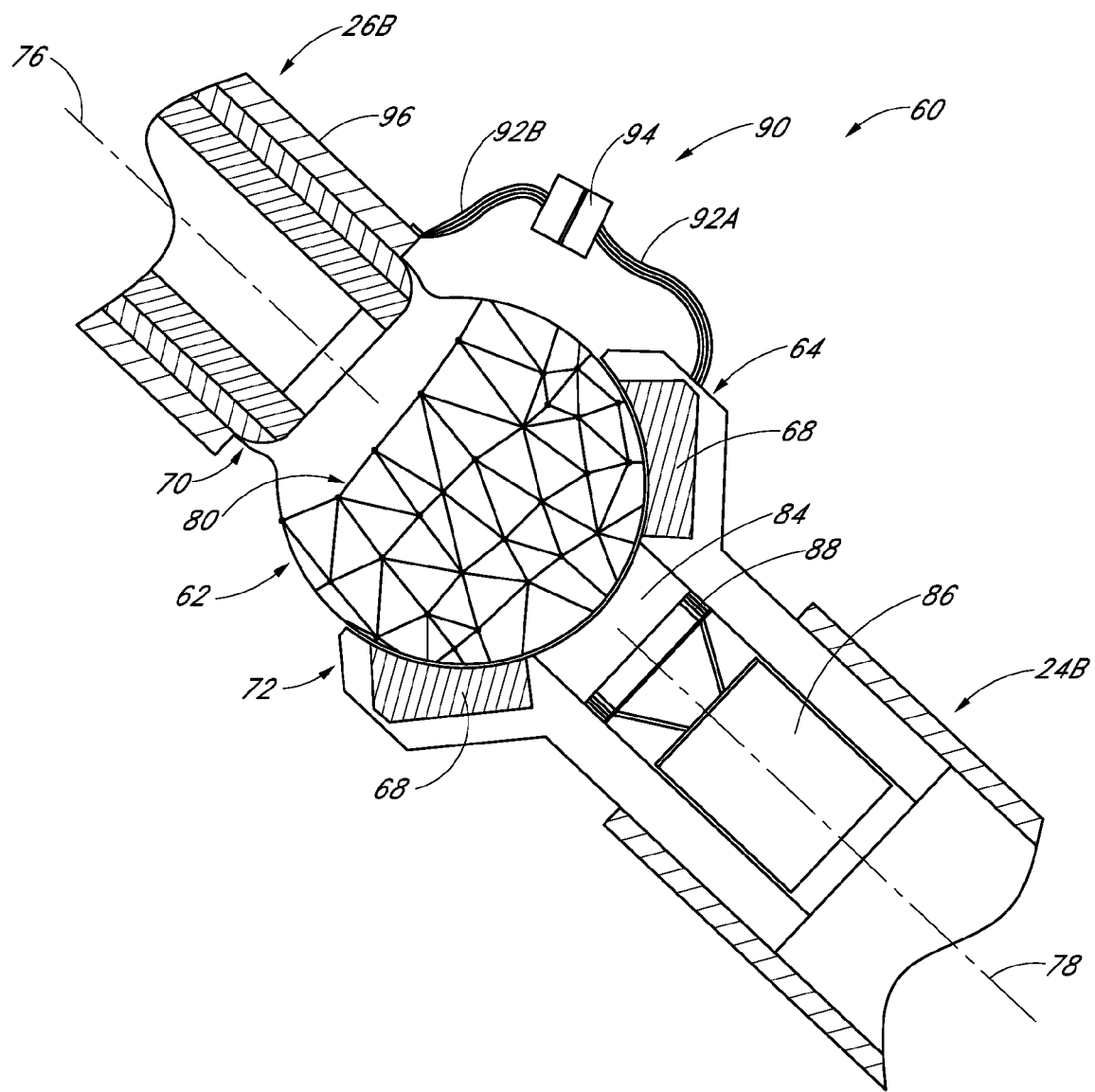
FIG. 3 is a cross-sectional view of an embodiment of a ball and socket type articulation member for use in a coordinate measuring device.

FIG. 3 shows a cross-sectional view of the ball and socket type articulation member 60 of FIG. 2. In the illustrated embodiment, the ball portion 62 is positioned at the end of transfer member 26B, and the corresponding socket portion 64 is located at the end of the adjacent transfer member 24B. The ball and socket portions 62, 64 can be separate from the adjacent transfer members or they can be integrally formed as single bodies with the transfer members. It will be appreciated that if the articulation member components are separate from the adjacent transfer members, one or more connection methods are used to secure the back and socket portions 62, 64 to the transfer members. Non-limiting examples include threading, gluing, welding, snap fitting, using fasteners (e.g., bolts, screws, pins, etc.) and the like.

In some preferred embodiments, the ball portion 62 can be maintained within the socket portion 64 by one or more magnets or an annular magnet 68 situated within the socket portion 64. As illustrated in FIG. 3, the magnets 68 exert an attractive force on the ball portion 62, urging the ball portion 62 towards the concave surface of the socket portion 64. Thus, the ball portion 62 can advantageously include one or more magnetically responsive materials (e.g., metal) on which the magnetic force may act.

As shown in FIG. 3, the annular magnet 68 can be situated at or near the concave mating surface of the socket portion 64. Alternatively, the socket portion 64 can include one or more additional magnets to ensure that the ball portion 62 is adequately maintained within the socket portion 64. As depicted in FIG. 3, the magnet 64 can be substantially flush with the adjacent surfaces of the socket portion 64 to form a continuous concave interface against which the ball portion 62 may move. However, it will be appreciated that the magnets 68 need not be flush with the adjacent surfaces of the socket portion 64. For example, the magnets may be recessed or otherwise set back with respect to the concave surface of the socket portion 64. Alternatively, the magnets may be located closer to the ball portion 62 than the adjacent non-magnetic surfaces of the socket portion 64, forming all or part of the contact surface with the adjacent ball portion 62. In other embodiments, the magnets may be positioned at more interior locations relative to the concave surface such that they are not directly exposed at the concave open end of the socket portion 64.

Preferably, the materials, size, shape, location, magnetic strength, orientation and other characteristics of the magnets are selected to ensure that the ball portion 62 is constantly maintained within the socket portion 64 during the entire range of motion of the articulation member 60 during operation. In addition, the magnets are preferably capable of resisting all anticipated forces and/or moments that may cause the ball portion 62 to separate from the socket portion 64. In other embodiments, the ball portion 62 of the articulation member 60 may include one or more magnets, either in addition to or in lieu of magnets positioned on the socket portion 64.

Other ways of maintaining the integrity of the ball and socket type articulation members 60 can be used, either in lieu of or in combination with magnets. For example, a vacuum can be used to urge the ball portion 62 within the socket portion 64. One or more vacuum sources may be located on the ball portion 62, socket portion 64 or both. Such vacuum sources may interface with the surfaces of the ball and/or socket portions 62, 64 through one or more vacuum ports. In other embodiments, the ball portion 62 may be secured within the socket portion 64 using springs or other biasing members.

In other embodiments, the articulation member 60 can be configured to otherwise mechanically retain the ball portion 62 within the socket portion 60. For example, in FIG. 3, the open end of the socket portion 64 may surround the ball portion 62 in a manner that prevents the ball portion 62 from being withdrawn from the inner concave portion of the socket portion 64. In such an embodiment, the socket portion 64 may include an adjustable housing that can be used to clamp down on the ball portion 62.

Regardless of the methods used to retain the ball portion 62 within the socket portion 64, the articulation member 60 is preferably configured for relatively simple and quick assembly and/or disassembly. For example, articulation members that utilize magnets may be separated by simply pulling the adjacent rigid transfer members 24B, 26B away from one another. Alternatively, the articulation member 60 may be configured so that the magnetic force that maintains the ball portion 62 within the socket portion 64 can be temporarily inactivated, permitting the transfer members 24B, 26B to be separated with greater ease. Such a feature is especially helpful when the magnetic forces maintaining the ball portion 62 within the socket portion 64 are relatively strong. In embodiments that utilize a vacuum to maintain the integrity of the articulation member, the ball portion 62 may be separated from the socket portion 64 by discontinuing the vacuum source (e.g., by actuation of a power switch or lever). Likewise, mechanical members used to join the ball and socket portions 62, 64 are preferably configured to be easily manipulated, allowing for easy connection and/or disconnection of the articulation member 60.

The features described in the above embodiments can provide CMMs with a desirable degree of modularity. For example, the relative ease with which ball and socket type articulation members may be connected and/or disconnected permits CMMs to be modified by either adding or removing transfer members. In addition, such modifications can be performed on-site where CMMs are being used. Thus, CMMs can be conveniently customized according to a particular application. Further, the simple assembly and disassembly features of the ball and socket type articulation members facilitate transportation and overall mobility of the CMM.

Preferably, smooth and unobstructed three-dimensional pivoting movement is permitted between the ball and socket portions 62, 64 of the articulation member 60. In one embodiment, the adjacent surfaces of the ball and socket portions 62, 64 are manufactured from one or more low friction materials, such as smooth metals, synthetic polymers and the like. One or more coatings, layers, lubricants and the like can be optionally applied to the ball portion 62 and/or the socket portion 64 to further reduce the effects of friction within the articulation member 60.

In preferred embodiments, the range of motion of the ball portion 62 relative to the socket portion 64 may be enhanced by the shape of the articulation member 60 and/or the rigid transfer members to which the articulation member 60 is joined. For example, in FIG. 3, transfer member 26B includes a step 70 or recess at the interface with the ball portion 62. Further, the open end 72 of the socket portion 64 may be angled away from the ball portion 62. Consequently, the extent to which the adjoining transfer members 24B, 26B can swivel relative to one another can be increased by eliminating what would otherwise be interfering surfaces.

As mentioned above, the position of a CMM probe in space at a given instant can be calculated, in part, by knowing the position of each of the articulation members. In the embodiment of FIG. 3, the specific angular position of the ball and socket type articulation member can be determined using optical imaging techniques. As shown, the surface of the ball portion 62 can include a graphical pattern 80. The depicted graphical pattern 80 comprises a plurality of dots or points that are scattered across the surface area of the ball portion 62. In the illustrated embodiment, the dots are interconnected by imaginary lines (i.e., the lines are illustrated for purposes of clarity in FIG. 3), forming a plurality of adjacent triangles. As will be discussed in greater detail below, each triangle is preferably uniquely shaped, sized and/or otherwise configured, such that it may be correlated to a particular location of the ball portion surface.

In FIG. 3, the socket portion 64 can include a bore 84 that is substantially coaxial to the center longitudinal axis 78 of the socket portion 64 and the attached transfer member 24B. The bore 84, which extends to the distal end of the socket portion 64, is preferably sized and shaped to receive an optical camera 86 configured to read the graphical pattern 80 situated on the ball portion 62. In the illustrated embodiment, both the bore 84 and the exterior of the camera 86 have a generally cylindrical shape. The camera 86 may be secured within the bore 84 using welds, adhesives, bolts, screws, pins, snap-fit members, engagement members, other fasteners and/or the like. Regardless of the exact attachment method used, the camera 86 is preferably statically connected to the socket portion 64 during operation of the CMM. In other embodiments, one or more additional cameras 86 may be used to read the graphical pattern 80. In other embodiments, an optical encoder, such as a spherical encoder can be used to read the graphical pattern 80.

Figure 4:
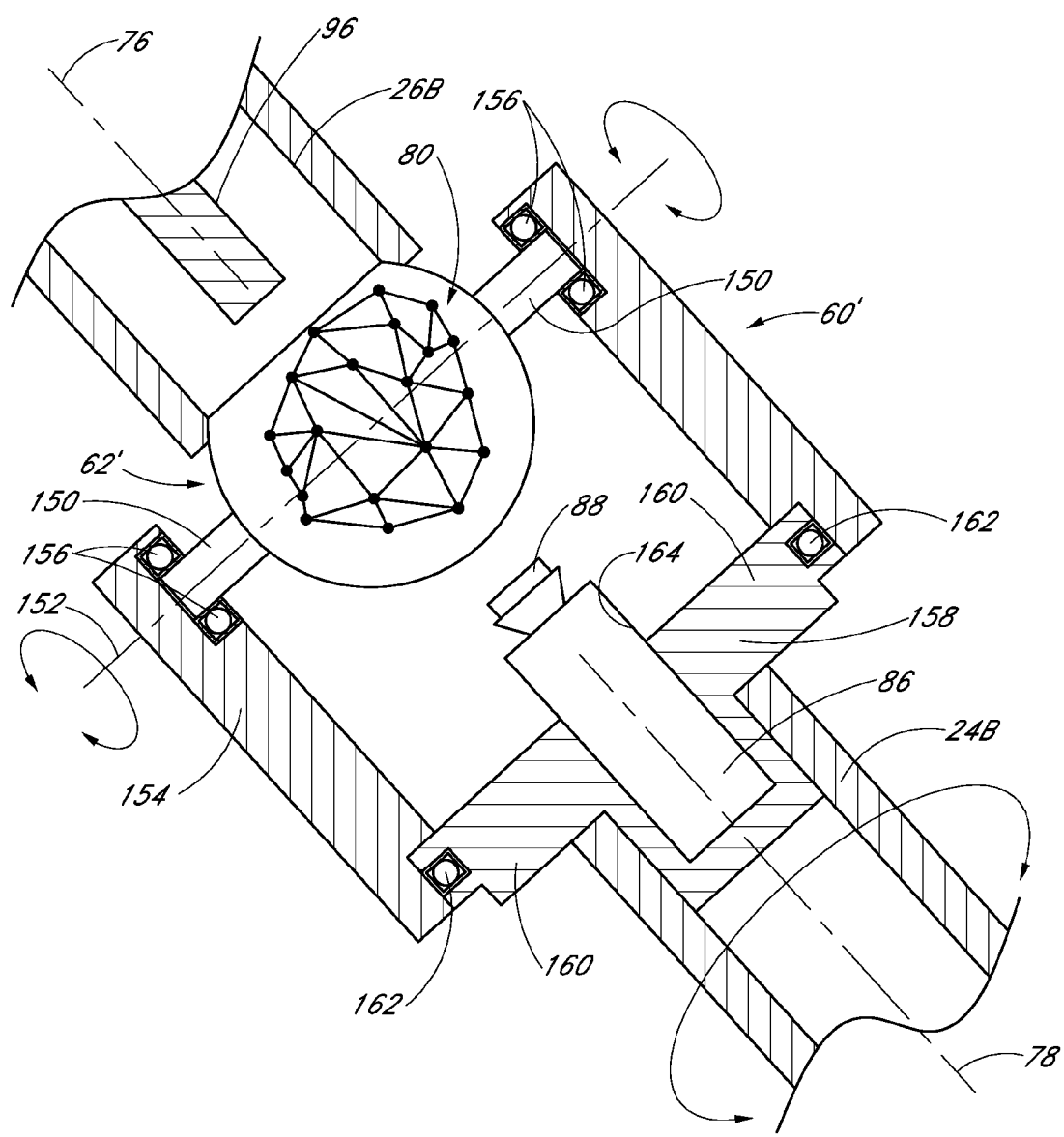
FIG. 4 is a cross-sectional view of an embodiment of two-axis articulation member for use in a coordinate measuring device

The bore 84 may additionally include a light element 88 to illuminate the section of the ball portion's outer surface visible through the bore 84. In FIG. 4, the light element 88 comprises a light ring that is securely positioned between the camera 86 and the inside diameter of the bore 84. Preferably, as described above in relation to the camera 86, the position of the light element 88 is immovably attached to the socket portion 64 during operation of the CMM. Moreover, in some arrangements, additional light elements may be provided as required by the particular configuration.

With continued reference to FIG. 3, power and/or data regarding the orientation or position of the various CMM components (e.g., articulation members, probe member, etc.) may be transmitted between adjoining rigid members 24B, 26B using a hardwired connection 90. Preferably, such a hardwired connection 90 is equipped with a coupling 94 to optionally disconnect the two hardwired connection ends 92A, 92B. For example, the coupling 94 can be disconnected prior to separating the transfer members connected by the articulation member 60. As illustrated in FIG. 3, at least one of the transfer members 26B may preferably include a slip ring 96 to which the hardwired connection 90 attaches. The slip ring 96 rotates relative to the interior segments of the transfer member 26B. Thus, the slip ring 96 ensures that the hardwired connection 90 does not interfere with the movement or operation of the ball and socket type articulation member 60, regardless of how the ball and socket portions 62, 64 are moved relative to one another.

Alternatively, a wireless connection can be used between adjacent transfer members to transmit coordinate data. Non-limiting examples of the types of wireless connections that may be used include infrared (IR), radio frequency (RF), Wi-Fi and others.

With reference to FIG. 4, a cross-sectional view of an embodiment of two-axis articulation member 60' including a ball 62' is illustrated. The two-axis articulation member can be used in some embodiments of CMM as illustrated in FIG. 2. In the illustrated embodiment, the ball portion 62' is positioned at the end of transfer member 26B. A two-axis rotatable joint connects the transfer member 26B to the adjacent transfer member 24B. The ball 62' can be separate from the transfer member 26B or it can be integrally formed as single bodies with the transfer member 26B. It will be appreciated that if the ball 62' is separate from the adjacent transfer members, one or more connection methods can be used to secure the back and socket portions 62' to the transfer members 26B. Non-limiting examples include threading, gluing, welding, snap fitting, using fasteners (e.g., bolts, screws, pins, etc.) and the like.

The ball 62' can be rotatably coupled to a joint body 154 to define a first axis of rotation 152 of the two-axis rotatable joint. With continued reference to FIG. 4, the ball 62' can have arms 150 extending therefrom and defining a first axis of rotation 152 of the joint. The arms 150 can be integrally formed with the ball 62', or can be connected using one or more of the connection methods described above. The arms can be rotatably coupled to a joint body 154, such as with bearings 156 to allow rotation of the joint body 154 about the first axis 152 relative to the ball 62' and transfer member 26B. In other embodiments, the ball 62' does not have arms 150 extending therefrom. Instead, in these embodiments, the ball 62' can be directly rotatably coupled to the joint body 154.

With continued reference to FIG. 4, the joint body 154 can be rotatably coupled to the adjacent transfer member 24B with respect to its longitudinal axis 78. In the illustrated embodiment, an endcap 158 for the transfer member 24B can have flanged extensions 160 for rotatably coupling to the transfer member 24B. Bearings 162 can rotatably couple the flanged extensions 160 of the endcap 158 to the joint body 154. In some embodiments, the endcap 154 can be fastened to the transfer member 24B such as by threaded coupling, adhesive, welding, or another suitable fastening technique. In other embodiments, the endcap 154 can be integrally formed with the transfer member 24B. In other embodiments, the transfer member 24B can have a flanged end to rotatably couple to the joint body 154.

With reference to FIG. 4, the endcap 158 can include a bore 164 that is substantially coaxial to the center longitudinal axis 78 of the endcap 158 and the attached transfer member 24B. The bore 164, which extends to a distal end of the endcap 158, is preferably sized and shaped to receive an optical camera 86 configured to read the graphical pattern 80 on the ball portion 62'. In the illustrated embodiment, both the bore 164 and the exterior of the camera 86 have a generally cylindrical shape. The camera 86 may be secured within the bore 164 using welds, adhesives, bolts, screws, pins, snap-fit members, engagement members, other fasteners and/or the like. Regardless of the exact attachment method used, the camera 86 is preferably statically connected to the endcap 158 during operation of the CMM. In other embodiments, one or more additional cameras 86 may be used to read the graphical pattern 80. In other embodiments, an optical encoder, such as a spherical encoder can be used to read the graphical pattern 80

With reference to FIG. 4, in the illustrated embodiment, the first axis of rotation 152 is transverse to, E.g., substantially perpendicular to, the longitudinal axis 78 of the transfer member 24B, which defines a second axis of rotation of the joint. Thus, the joint can be articulated about two axes of rotation. Advantageously, in the illustrated embodiment, the bearings 156, 162 rotatably coupling the joint can allow rotation while maintaining a known separation between the components of the joint.

As mentioned above, the position of a CMM probe in space at a given instant can be calculated, in part, by knowing the position of each of the articulation members. In the embodiment of FIG. 4, the specific angular position of the two-axis joint type articulation member relative to the two axes of rotation 152, 78 can be determined using optical imaging techniques. As shown, the surface of the ball portion 62' can include a graphical pattern 80. The depicted graphical pattern 80 comprises a plurality of dots or points that are scattered across the surface area of the ball portion 62. In the illustrated embodiment, the dots are interconnected by imaginary lines (i.e., the lines are illustrated for purposes of clarity in FIG. 4), forming a plurality of adjacent triangles. As will be discussed in greater detail below, each triangle is preferably uniquely shaped, sized and/or otherwise configured, such that it may be correlated to a particular location of the ball portion surface.

As discussed above with respect to FIG. 3, in some embodiments of two-axis joint, the bore 164 may additionally include a light element 88 to illuminate the section of the ball portion's outer surface visible through the bore 164. In FIG. 4, the light element 88 comprises a light ring that is securely positioned between the camera 86 and the inside diameter of the bore 164. In other embodiments, the joint can include more than one light element 88.

Figure 5:
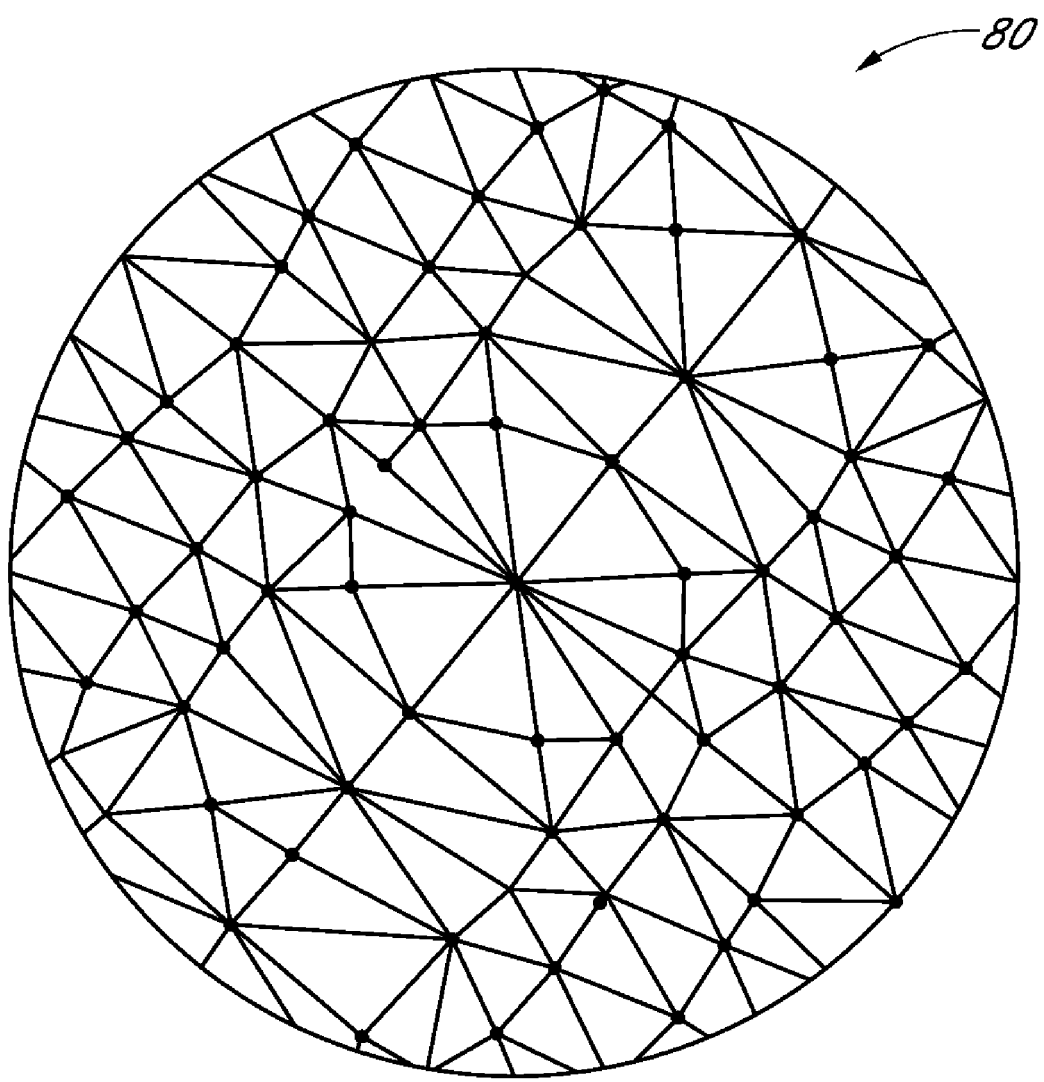
FIG. 5 is a front elevation view of a circular section of the ball portion of an articulation member depicting one embodiment of a graphical pattern.

As discussed above with respect to FIG. 3, in some embodiments of two-axis joint, the power and/or data regarding the orientation or position of the various CMM components (e.g., articulation members, probe member, etc.) may be transmitted between adjoining rigid members 24B, 26B using a hardwired connection. Preferably, such a hardwired connection is equipped with a coupling to optionally disconnect two hardwired connection ends. As illustrated in FIG. 4, at least one of the transfer members 26B may preferably include a slip ring 96 to which the hardwired connection attaches. The slip ring 96 rotates relative to the interior segments of the transfer member 26B. Thus, the slip ring 96 ensures that the hardwired connection does not interfere with the movement or operation of the two-axis articulation member 60', regardless of how the transfer members 24B, 26B are moved relative to one another. Alternatively, a wireless connection can be used between adjacent transfer members to transmit coordinate data. Non-limiting examples of the types of wireless connections that may be used include infrared (IR), radio frequency (RF), Wi-Fi and others The embodiment in FIG. 5 illustrates a graphical pattern 80 as viewed from within the bore 84, 164 of the socket portion 64 or endcap 158. Thus, this is the extent of the graphical pattern 80 that is detectable by the camera 86 at a particular angular orientation of the articulation member. Preferably each triangle or other shape included in the graphical pattern 80 is unique. For example, each triangle may vary according to size, dimensions, shape, angle of interior angles, ratio of sides and/or the like. Consequently, the camera 86 may correlate the area it has optically detected to a distinct position of the articulation member. In one embodiment, the camera 86 can determine the exact orientation of the articulation member by detecting only a single triangle or other graphical feature. However, in other arrangements, the camera 86 may need to read and identify two, three or more triangles or other features before accurately determining the position of the corresponding articulation member. Further, one or more algorithms may be used to correlate the pattern 80 detected by the camera 86 to a particular articulation member position. As described below with reference to FIG. 6, the acquired data relates the position of the various articulation members to determine the coordinates of the CMM probe member.

Figure 6:
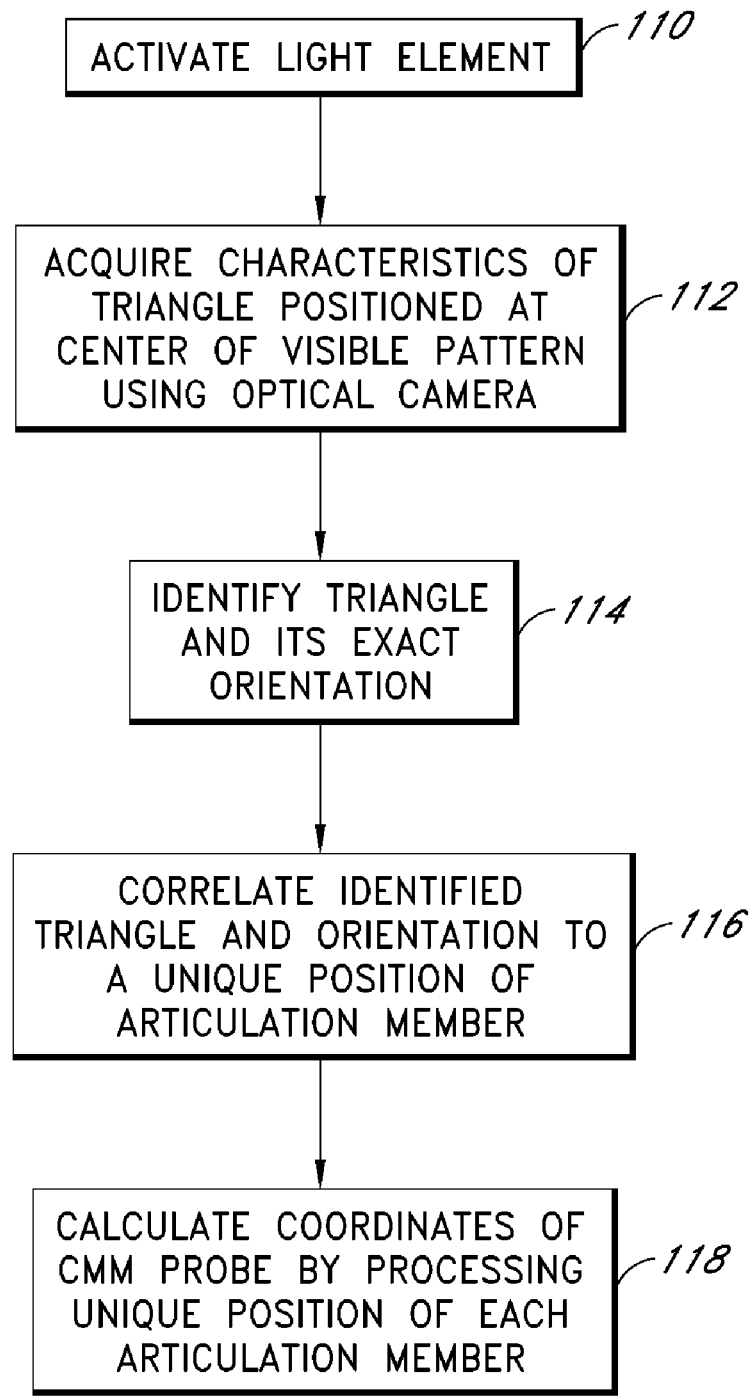
FIG. 6 is a flowchart for obtaining coordinate data with a CMM that includes a ball and socket type articulation member according to one embodiment.

With reference to FIG. 6, the light element may be initially activated 110 to illuminate the graphical pattern 80 on the exposed surface of the ball portion 62, 62' of the articulation member 60, 60'. In one embodiment, the optical camera 86 may next determine which triangle is situated at the center of the exposed graphical pattern 80 and acquire its characteristics 112. For example, the triangle's size, shape, area, interior angles and/or the like may be detected by the camera 86. Such data may be used to identify the triangle and its exact orientation 114, especially if each triangle in the graphical pattern 80 is unique. Further, information regarding the orientation of the identified triangle can be correlated to a unique position (e.g., bend, rotation, etc.) of the ball and socket type articulation member 116. Finally, data collected from each articulation member in a CMM are used to calculate the exact coordinates of the probe member 118. In alternative arrangements, the camera 86 may need to acquire information regarding two or more triangles or other graphical benchmarks within the graphical pattern 80 to determine the orientation of an articulation member.

Those of skill in the art will appreciate that other graphical patterns, in addition to or in lieu of, triangles can be used. For example, in some embodiments, the graphical pattern may comprise dots, circles, rectangles and/or any other geometrical shape. In other embodiments, the surface may be color coded, and the camera configured to detect subtle differences in color shades, intensities, hues, etc. Furthermore, it is contemplated that different graphical patterns can be used in ball-and-socket articulation members 60, which provide three axes of movement than are used in two-axis articulation members 60'. Preferably, the graphical elements included within a particular pattern can be reliably and accurately detected and distinguished from one another by the optical camera. The graphical pattern 80 can be placed on a surface of the articulation member (e.g., ball portion 62, 62') using any suitable method. For example, the pattern 80 may be marked on a ball portion surface using a permanent dye, ink or other color pigment. Alternatively, the graphical pattern may be etched or shaped directly into a surface. In other non-limiting embodiments, the graphical pattern can placed on the surface as part of a coating and/or plating.

In the embodiments of the ball and socket type articulation member described above, the graphical surface has been included on the ball portion 62. However, it will be appreciated that the articulation member may be alternatively configured so that the graphical surface is positioned on the concave surface of the socket portion 64 or on an inner surface of the joint body 154. In such embodiments, the camera or other detection member is preferably secured within the ball portion 62.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments, combinations, sub-combinations and/or uses and obvious modifications and equivalents thereof. Accordingly, the invention is not intended to be limited by the specific disclosures of preferred embodiments herein.

What is claimed is:
1. A coordinate measurement apparatus comprising:
an articulated arm comprising a first end, a second end, at least a first arm segment and a second arm segment therebetween;

at least one joint body connecting said first arm segment to said second arm segment, said joint body supporting both pivots and rotations between the first and second arm segments, wherein the joint body comprises at least one spherical pattern and at least one reader device configured to read said at least one pattern; and a measurement probe disposed on said first end of said articulated arm.

2. The coordinate measurement apparatus of claim 1, wherein the reader device comprises a camera.

3. The coordinate measurement apparatus of claim 1, further comprising a slip ring rotatably connected to first arm segment.

4. The coordinate measurement apparatus of claim 3, further comprising at least one hardwired connection attached to the slip ring, said hardwired connection in electronic communication with the second arm segment, wherein said hardwired connection is configured to transfer a coordinate data between said first arm segment and said first arm segment.

5. A coordinate measurement apparatus comprising:

an articulated arm comprising a first end, a second end, at least a first arm segment, a second arm segment, and a third arm segment therebetween, the arm segments being rotatably connected in sequence;

at least one joint connecting said first arm segment to said second arm segment, said joint configured to allow said first arm segment to pivot and rotate relative to said second arm segment, wherein the joint connects the arm segments by an attractive force; and a measurement probe attached to said first end of said articulated arm.

6. The coordinate measurement apparatus of claim 5, wherein the at least three sequentially connected arm segments are at least rotatably or pivotably connected.

7. The coordinate measurement apparatus of claim 5, wherein the articulated arm comprises at least one rotational encoder.

8. The coordinate measurement apparatus of claim 5, wherein the joint comprises a ball and socket joint.

9. The coordinate measurement apparatus of claim 5, wherein the joint comprises a joint body rotatably coupled to the first arm segment to define a first axis of rotation of the joint and rotatably coupled to the second arm segment to define a second axis of rotation of the joint.

10. The coordinate measurement apparatus of claim 9, wherein the joint further comprises a data surface coupled to the first arm segment and a data acquisition device coupled to the second arm segment, the data acquisition device configured to acquire data from the data surface.

11. The coordinate measurement apparatus of claim 10, wherein the data surface comprises a ball portion having a graphical pattern disposed on an outer surface thereof.

12. The coordinate measurement apparatus of claim 10, wherein the data acquisition device comprises an optical camera.

13. The coordinate measurement apparatus of claim 10, wherein the joint further comprises a light element configured to illuminate the data surface.

14. The coordinate measurement apparatus of claim 5, wherein the attractive force comprises a magnetic force.

15. The coordinate measurement apparatus of claim 5, wherein the attractive force comprises a suction force provided by a vacuum.

16. A coordinate measurement apparatus comprising:

an articulated arm having a first end, a second end, at least a first arm segment and a second arm segment therebetween;

at least one joint connecting said first arm segment to said second arm segment, said joint comprising a first joint member, a second joint member, at least one sensor, and at least one graphical pattern defining a multitude of unique geometric shapes;

a measurement probe attached to said first end of said articulated arm, wherein said first arm segment is configured to pivot and rotate relative to said second arm segment via the first and second joint members, said pivots and rotations being measurable by the at least one sensor.

17. The coordinate measurement apparatus of claim 16, wherein the graphical pattern defines a multitude of unique triangles.

18. The coordinate measurement apparatus of claim 17, wherein the one or more sensors are configured to detect a single triangle.

19. A coordinate measurement apparatus comprising:

an articulated arm having a first end, a second end, at least a first arm segment and a second arm segment therebetween;

at least one joint connecting said first arm segment to said second arm segment, said joint comprising a first joint member, a second joint member, at least one sensor, and at least one rounded graphical pattern;

a measurement probe attached to said first end of said articulated arm, wherein said first arm segment is configured to pivot and rotate relative to said second arm segment via the first and second joint members, said pivots and rotations being measurable by the at least one sensor.

20. The coordinate measurement apparatus of claim 19, wherein the sensor comprises a camera.

* * * * *

UNITED STATES PATENT AND TRADEMARK OFFICE
CERTIFICATE OF CORRECTION

PATENT NO. : 8,015,721 B2  
APPLICATION NO. : 12/822940  
DATED : September 13, 2011  
INVENTOR(S) : Homer L. Eaton and Paul A. Ferrari Page 1 of 1

It is certified that error appears in the above-identified patent and that said Letters Patent is hereby corrected as shown below:

Column 2, Lines 5-6, Change "said first arm segment and said first arm segment" to --said first arm segment and said second arm segment.--.

Column 3, Line 3, Change "device" to --device;--.

Column 8, Line 56, Change "80" to --80.--.

Colum 9, Line 42, Change "others" to --others.--.

Column 11, Lines 20-21, Claim 4, Change "said first arm segment and said first arm segment" to --said first arm segment and said second arm segment.--.

Signed and Sealed this
Third Day of July, 2012

David J. Kappos
*Director of the United States Patent and Trademark Office*